O. A. SIMPSON.
PROCESS OF MANUFACTURING METAL TUBES.
APPLICATION FILED AUG. 23, 1910.
993,116.
Patented May 23, 1911.
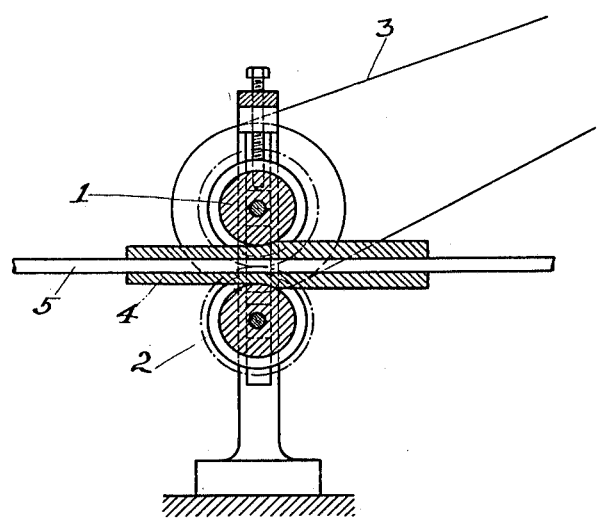
Witnesses:
Inventor:
Otto Archibald Simpson,
By Knight Bros.
Attys.

UNITED STATES PATENT OFFICE.

OTTO ARCHIBALD SIMPSON, OF CHARLOTTENBURG, GERMANY, ASSIGNOR TO SIEMENS & HALSKE A. G., OF BERLIN, GERMANY, A CORPORATION OF GERMANY.

PROCESS OF MANUFACTURING METAL TUBES.

993,116.     Specification of Letters Patent.     Patented May 23, 1911.

Application filed August 23, 1910. Serial No. 578,582.

*To all whom it may concern:*

Be it known that I, OTTO ARCHIBALD SIMPSON, a subject of the German Emperor, and residing at Charlottenburg, near Berlin, Germany, have invented a certain new and useful Process of Manufacturing Metal Tubes, of which the following is a specification.

My invention relates to the manufacture of metal tubes and a primary object is to provide an improved process of manufacturing tubes of very elastic metals, such as tantalum. To this end I first make a cylindrical or prismatic chamber in the metal, most simply by drilling a body composed of the metal, whereupon I place an insertion or core into the hole thus made and then treat the body further by drawing, rolling or otherwise mechanically in such manner that a tube of the desired diameter is obtained. By employing as core a metal of less elasticity than the outer metal but of sufficient tensile strength, it is possible to withdraw the core from the finished tube without appreciable difficulty, because the but slightly elastic core experiences greater permanent changes in shape under the strains to which it is subjected when being worked than the tube, and the tube consequently separates from the core after the forces tending to change its shape have ceased and obtains again a rather larger diameter and less length.

The accompanying drawing illustrates in vertical section an apparatus for rolling the tube upon the core material.

In the drawing 1 and 2 represent the rollers driven by any suitable power such as belt 3; 4 the tube which is being formed, and 5 the core of less elastic material than the tube.

In this manner it is possible to make seamless tubes of metals which it was exceedingly difficult or quite impossible to use heretofore in practice. In addition it is possible to make tubes of great fineness.

If when making such a tube of small diameter a material were employed for the core which is either too similar in its elastic properties to the metal which is to be worked or does not possess sufficient tensile strength in order to be able to be withdrawn, my process would completely break down, particularly if the diameter of the tube were to be small. It is true it might be thought that the core could be removed in such a case by chemical solution or by fusing it. Neither of these methods is successful, however, when it is a matter of a very small diameter and relatively great length of the tube.

According to my process it is possible, for example, to draw very fine tubes of tantalum with the aid of a core of iron or steel.

I claim:—

1. The herein described process of manufacturing tubes of an elastic metal, which consists in making a chamber in a body of the metal, inserting into the chamber a core of a less elastic metal, mechanically reducing the diameter of the body and the core contained therein, and removing the core from the body.

2. The herein described process of manufacturing tubes of tantalum, which consists in drilling a hole in a body of tantalum, inserting an iron core into the hole, mechanically working the body of tantalum and the iron core contained therein to a smaller diameter, and removing the core from the tantalum tube thus obtained.

In testimony whereof I have signed my name to this specification in the presence of two witnesses.

OTTO ARCHIBALD SIMPSON.

Witnesses:
  HENRY HASPER,
  ARTHUR SCHROEDER.